United States Patent
Rogers et al.

(10) Patent No.: US 10,691,976 B2
(45) Date of Patent: Jun. 23, 2020

(54) SYSTEM FOR TIME-EFFICIENT ASSIGNMENT OF DATA TO ONTOLOGICAL CLASSES

(71) Applicant: Accenture Global Solutions Limited, Dublin (IE)

(72) Inventors: Phillip Henry Rogers, Half Moon Bay, CA (US); Andrew E. Fano, Lincolnshire, IL (US); Joshua Neland, San Francisco, CA (US); Allan Enemark, Campbell, CA (US); Tripti Saxena, Sunnyvale, CA (US); Jana A. Thompson, San Francisco, CA (US); David William Vinson, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 468 days.

(21) Appl. No.: 15/815,228

(22) Filed: Nov. 16, 2017

(65) Prior Publication Data

US 2019/0147297 A1    May 16, 2019

(51) Int. Cl.
*G06K 9/62* (2006.01)
*G06N 20/00* (2019.01)
*G06F 16/36* (2019.01)
*G06F 16/904* (2019.01)

(52) U.S. Cl.
CPC ......... *G06K 9/6259* (2013.01); *G06F 16/367* (2019.01); *G06F 16/904* (2019.01); *G06K 9/6256* (2013.01); *G06N 20/00* (2019.01)

(58) Field of Classification Search
USPC .............................................. 382/155; 706/25
See application file for complete search history.

(56) References Cited

U.S. PATENT DOCUMENTS 10,628,527 B2 * 4/2020 Williams ................ G06F 40/30
2009/0252404 A1 * 10/2009 Lecerf .................. G06K 9/6254
382/154

(Continued)

OTHER PUBLICATIONS

Mayer, Richard E. "Rote versus meaningful learning." Theory Into Practice 41 (4) Autumn 2002: 226-232.

(Continued)

*Primary Examiner* — Ishrat I Sherali
(74) *Attorney, Agent, or Firm* — Fish & Richardson P.C.

(57) ABSTRACT

Implementations are directed to receiving a set of training data including a plurality of data points, at least a portion of which are to be labeled for subsequent supervised training of a computer-executable machine learning (ML) model, providing at least one visualization based on the set of training data, the at least one visualization including a graphical representation of at least a portion of the set of training data, receiving user input associated with the at least one visualization, the user input indicating an action associated with a label assigned to a respective data point in the set of training data, executing a transformation on data points of the set of training data based on one or more heuristics representing the user input to provide labeled training data in a set of labeled training data, and transmitting the set of labeled training data for training the ML model.

20 Claims, 7 Drawing Sheets

(56) References Cited

U.S. PATENT DOCUMENTS

| | | | |
|---|---|---|---|
| 2012/0041953 A1* | 2/2012 | Dumais | G06F 16/353 |
| | | | 707/739 |
| 2012/0158623 A1* | 6/2012 | Bilenko | G06N 20/00 |
| | | | 706/12 |
| 2015/0113018 A1* | 4/2015 | Steed | G06F 16/2465 |
| | | | 707/776 |
| 2016/0253679 A1* | 9/2016 | Venkatraman | G06Q 30/0185 |
| | | | 705/310 |
| 2018/0165604 A1* | 6/2018 | Minkin | G06Q 10/06 |
| 2018/0268319 A1* | 9/2018 | Guo | G06N 5/04 |
| 2019/0213208 A1* | 7/2019 | Brockman | G06F 16/9038 |
| 2020/0074984 A1* | 3/2020 | Ho | G10L 15/1815 |

OTHER PUBLICATIONS

Ratner, Alex, et al. "Data Programming: Machine Learning with Weak Supervision." Snorkel Blog 2017. Retrieved from <http://hazyresearch.github.io/snorkel/blog/weak_supervision.html>, 6 pages.
Ratner, Alexander, et al. "Data Programming: Creating Large Training Sets, Quickly." arXiv:1605.07723v3 [stat.ML]. May 26, 2016. Retrieved from <http://arxiv.org/abs/1605.07723>, 27 pages.

\* cited by examiner

SYSTEM FOR TIME-EFFICIENT ASSIGNMENT OF DATA TO ONTOLOGICAL CLASSES

BACKGROUND

Machine learning (ML) can be described as an application of artificial intelligence (AI), in which a ML model is built using algorithms that iteratively learn from training data. Training data can be described as known data points that include patterns, which the resulting ML model should predict. An example ML model can include, without limitation, a classifier that receives input data (e.g., an image), and assigns the input data to one or more classes (e.g., human, cat, dog, based on content of the image). Various techniques can be used to train an ML model.

An example training technique includes supervised learning, in which the training data is labeled, and the labeled training data is processed (e.g., using linear regression) to infer the ML model. However, to implement supervised learning, the training data, which may require relatively large data sets, must be accurately labeled. This can be a daunting, time-consuming, and resource intensive task, which requires a significant level of domain knowledge (e.g., labeling a drug with one or more conditions that the drug treats).

SUMMARY

Implementations of the present disclosure are generally directed to labeling training data for training machine learning (ML) models. More particularly, implementations of the present disclosure are directed to a visual platform for relatively rapid assignment of labels to training data based on ontological classes.

In some implementations, actions include receiving a set of training data including a plurality of data points, at least a portion of which are to be labeled for subsequent supervised training of a computer-executable machine learning (ML) model, providing at least one visualization based on the set of training data, the at least one visualization including a graphical representation of at least a portion of the set of training data, receiving user input associated with the at least one visualization, the user input indicating an action associated with a label assigned to a respective data point in the set of training data, executing a transformation on data points of the set of training data based on one or more heuristics representing the user input to provide labeled training data in a set of labeled training data, and transmitting the set of labeled training data for training the ML model. Other implementations of this aspect include corresponding systems, apparatus, and computer programs, configured to perform the actions of the methods, encoded on computer storage devices.

These and other implementations can each optionally include one or more of the following features: the at least one visualization is provided based on a sparse representation provided from the training data; the sparse representation includes a sparse matrix; the label is provided at least partially based on a knowledge model including a data structure that records an ontology associated with a domain of the ML model; the at least one visualization includes a two-dimensional data map; the at least one visualization includes a coincidence grid; and the user input includes at least one search term, and the transformation results in an update to the at least one visualization based on the at least one search term.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to labeling training data for training machine learning (ML) models. More particularly, implementations of the present disclosure are directed to a visual platform for relatively rapid assignment of labels to training data based on ontological classes. The visual platform of the present disclosure provides one or more visualizations of the training data during a semi-automated data labeling process, and visual tools that enable a user to aggregate, and navigate the visualization(s). In this manner, the user provides input to the data labeling process that can be used to revise assigned labels, and/or automatically assign labels to data points within the training data. The user input is captured as heuristics, which capture knowledge of the labeling process, and are used to conduct iterative transformations on the training data to provide increasingly accurate labels for the training data. More generally described, the platform of the present disclosure facilitates the loading, access, visualization, categorization, and preparation of data to be used in training ML. Further, the platform supports data labeling that is scalable to data of varying size, is data type agnostic, and can be used to assign datum to multiple user-defined ontological categories.

In general, and as described in further detail herein, implementations of the present disclosure provide iterative labelling of training data (e.g., individual data points), and, at each iteration, remapping a displayed projection to minimize like category scatter, and maximize unlike category spacing. By increasing the number of labeled training data, definitions of scatter and similarity are improved. In accordance with implementations of the present disclosure, data mapping is initialized with an unsupervised approach, and clusters are uncovered. The clusters can be analyzed to determine whether any relevant models are present in the labeled training data (e.g., patterns readily apparent in the labeled training data). After a portion of the training data has been labeled, and remapped, correlative features of unlabeled training data is mapped to regions near labels. The unlabeled training data are candidates for reinforcing, and refining the labels. For example, unlabeled training data occupies the margins of neighborhoods of labeled training data, and present opportunities for refining label categories, and group classification.

In some implementations, as labeled training data is used to remap the projection, users are able to visually evaluate the selectivity of the model-data combination that is being merged. If clusters or biasing in the map is observed to be associated with each of the classes, then the training data is a good candidate for the ML model. If the labeled data remains randomly distributed in the data map even after much of the data is labeled, then the training data is not compatible with the ML model.

Figure 1:
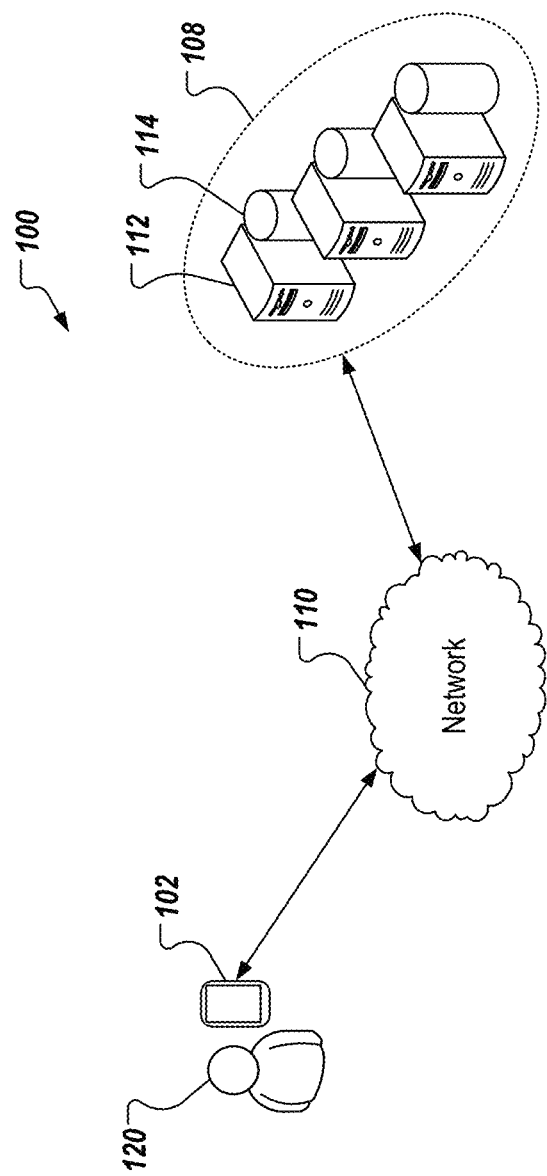
FIG. 1 depicts an example high-level architecture in accordance with implementations of the present disclosure.

FIG. 1 depicts an example high-level architecture 100 in accordance with implementations of the present disclosure. The example architecture 100 includes a device 102, a server system 108, and a network 110. In some examples, the network 110 includes a local area network (LAN), wide area network (WAN), the Internet, a cellular telephone network, a public switched telephone network (PSTN), a private branch exchange (PBX), a next generation network (NGN), or any appropriate combination thereof, and connects web sites, devices (e.g., the device 102), and server systems (e.g., the server system 108). In some examples, the network 110 can be accessed over a wired and/or a wireless communications link. For example, mobile devices, such as smartphones can utilize a cellular network to access the network 110.

In the depicted example, the server system 108 includes at least one server system 112, and data store 114 (e.g., database). In some examples, at least one server system 112 hosts one or more computer-implemented services that users can interact with using devices. For example, the server system 112 can host a visual platform for relatively rapid assignment of labels to training data based on ontological classes in accordance with implementations of the present disclosure. In some examples, the device 102 can each include any appropriate type of computing device such as a desktop computer, a laptop computer, a handheld computer, a tablet computer, a personal digital assistant (PDA), a cellular telephone, a network appliance, a camera, a smartphone, a telephone, a mobile phone, an enhanced general packet radio service (EGPRS) mobile phone, a media player, a navigation device, an email device, a game console, or an appropriate combination of any two or more of these devices, or other data processing devices. A user 120 can use the device 102 to interact with the visual platform hosted on the server system 112.

As introduced above, supervised learning includes labeling training data, and using the labeled training data to train a ML model. However, to implement supervised learning, the training data, which can include relatively large data sets, must be accurately labeled. This can be a daunting, time-consuming, and resource intensive task, which requires a significant level of domain knowledge (e.g., labeling a drug with one or more conditions that the drug treats). In view of this, so-called weak supervision techniques have been developed, which can be used to concurrently label multiple training data. Example weak supervision techniques include, without limitation, applying domain-specific rules for labeling training data, clustering and group assignment, data exploration through visualization tools with manual mass labeling, and attention focusing (e.g., highlighting candidates and preselecting labels for confirmation). An example weak supervision system includes Snorkel, developed by Stanford University in Stanford, Calif. Snorkel can be described as a training data creation and management system focused on information extraction. Implementations of the present disclosure may be described herein with reference to Snorkel. However, it is contemplated that implementations of the present disclosure can be realized using any appropriate weak supervision system.

In general, weak supervision enables high-level supervision of an at least partially automated labeling process (instead of case-by-case labeling), and uses statistical techniques to account for noisy labels in the training data. Labeling training data using weak supervision increases the speed, at which training data is labeled, promotes data serialization using data abstractions (resulting in more robust ML models), promotes a collaborative workflow, and decouples the amount of work required for labeling from amount of training data that is to be labeled. In further detail, weak supervision systems, such as Snorkel, implement a so-called data programming paradigm, in which a set of labeling functions are executed to label training data (e.g., scripts that programmatically label data). In some examples, the resulting labels are noisy (e.g., include conflicting labels, and/or outliers). However, the weak supervision system can automatically model the labeling process to determine which labeling functions are more accurate than other labeling functions. This information can be used train data labeling model. In some examples, by modeling a (noisy) data labeling process, low-quality labeling functions from a user can be used to train relatively high-quality ML models.

In accordance with the present disclosure, and as described in further detail herein, a visual ensemble labeling (VEL) platform (also referred to as a workbench) is provided that bundles weak supervision strategies, and enables users to visually interact with the training data to provide resource-efficient, and accurate labeling of the training data. More particularly, weak supervision systems, such as Snorkel, lack visually-driven data labeling and validation tools. Accordingly, implementations of the present disclosure provide visual data labeling, and validation tools, clearer candidate label extraction processes, and more granular candidate evaluation tools. Implementations of the VEL platform of the present disclosure provide data mapping, and categorization functionality, which increases the speed of labeling by leveraging visual multiplexing, elucidate novel categories for labeling, and support training of robust ML models based on human intelligence.

Implementations of the present disclosure are described in further detail herein with references to example weak supervision strategies, which include rule authoring (e.g., using a system, such as Snorkel), and visual data labeling (e.g., increasing speed of labeling by leveraging visual multiplexing). It is contemplated, however, that implementations of the present disclosure can be realized using any appropriate weak supervision strategy. Further, implementations of the present disclosure are described in detail herein with reference to example training data, which includes a data set of models of automotive vehicles (e.g., models of sports cars provided as structured vehicle data published by the U.S. Department of Energy). It is contemplated, however, that implementations of the present disclosure can be realized using any appropriate training data.

In some implementations, the VEL platform is provided in a stack including multiple layers. Example layers include a data input layer, a data storage and access layer, a data labeling layer, and an output layer. Without limitation, an example stack includes the Elastic stack (also referred to as the ELK stack) provided by Elasticsearch BV of the Netherlands. As described in further detail herein, the VEL platform of the present disclosure can be integrated into the Elastic stack. By integrating the VEL platform of the present disclosure into a stack, such as the Elastic stack, a flexible deployment is realized for integration with third-party model building and analytics platforms (e.g., open source platforms).

Using the Elastic stack as a non-limiting example, the data input layer can include a server-side data processing pipeline (e.g., Logstash provided by Elasticsearch BV) that ingests and transforms data from one or more data sources, and a data loading and parsing dialogue (e.g., provided as a component of the VEL platform of the present disclosure). The data storage and access layer can include a search and analytics engine (e.g., Elasticsearch provided by Elasticsearch BV), and custom wrappers and schemas (e.g., provided with the VEL platform of the present disclosure). In some examples, the custom wrappers and schemas are used for feature elucidation, and data lineage tracking, as described in further detail herein. The data labeling layer can include the modular data interaction and labeling interface of the present disclosure (e.g., provided with the VEL platform of the present disclosure). The output layer can include a data visualization and navigation component (e.g., Kibana provided by Elasticsearch BV), a web services component (e.g., provided with the VEL platform of the present disclosure), and a labeled training data export component (e.g., provided with the VEL platform of the present disclosure).

While the Elastic stack has been provided as a non-limiting example, it is contemplated that any appropriate database technology can be used to realize implementations of the present disclosure. For example, another non-limiting example technology can include SQlite, which can be described as a self-contained, high-reliability, embedded, full-featured, public-domain, SQL database engine.

Figure 2A:
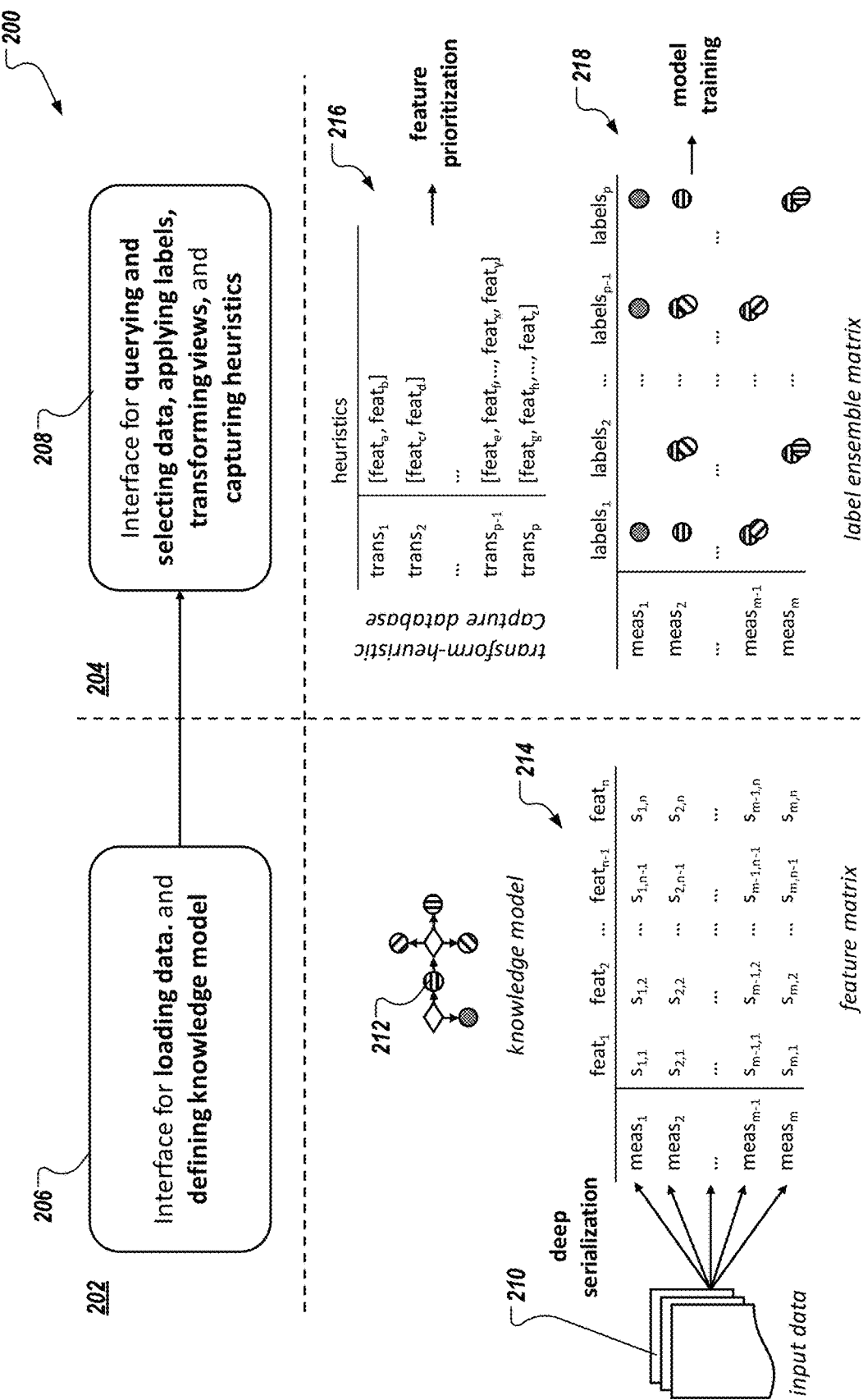
FIGS. 2A and 2B depict example conceptual diagrams in accordance with implementations of the present disclosure.

FIG. 2A depicts a conceptual diagram 200 in accordance with implementations of the present disclosure. In the example of FIG. 2A, a first portion 202 conceptually depicts loading of training data, and defining a knowledge model through an interface 206, and a second portion 204 conceptually depicts querying and selecting training data, applying labels, transforming views, and capturing heuristics through an interface 208.

With particular reference to the first portion 202, input data 210 (training data) is provided to the stack, and a knowledge model 212 is defined. In some examples, the input data 210 can be provided in any appropriate format (e.g., data composition). Example formats include, without limitation, unstructured (e.g., images, text, video, audio), semi-structured (e.g., XML, HTML, JSON, NoSQL database), and structured (e.g., tables, spreadsheets, SQL databases). In some examples, and as described in further detail herein, types of data granularity can be provided based on the format of the input data. Example types of data granularity include, without limitation, individual measurements, unsupervised clustering, or mapping, and feature-based aggregation.

In some implementations, the VEL platform provides one or more graphical user interfaces (GUIs), through which the user can select the file holding the input data 210 for upload, can indicate a format of the input data 210, and can select discretization of the input data 210. In some examples, discretization is performed by the stack to partition continuous features to nominal features. Example discretization includes frequency, area, and manual (e.g., manual selection of a range, number of bins). In some implementations, the input data is serialized by the VEL platform. In some examples, serialization can be described as a process of translating data structures into a format that can be processed by the VEL platform to provide labels, as described herein.

In some examples, the knowledge model 212 represents an ontology of a particular domain. The knowledge model 212 can be recorded in a computer-readable file, and is used for classifying (categorizing) data points. In some examples, the knowledge model 212 includes multiple entities, and, for each entity, a label (e.g., category, class) that can be assigned to data points of the input data. An ontology can be described as a formal naming and definition of the types, properties, and interrelationships of entities within a respective domain, and provides a taxonomy that can be used for labels to be applied to the input data. In the example context, the knowledge model 212 can provide an ontology that relates vehicles to types of vehicles, such as sports cars, to models of sports cars (e.g., Camaro, Mustang, Challenger, 911), to model years, to manufacturers (makes), to engine displacement (e.g., 2.5 L, 3.8 L, 5.0 L), to drive type (e.g., rear-wheel drive, front-wheel drive, all-wheel drive), and the like. In some examples, each entity recorded in the knowledge model can be used as a label for the input data. In the example of FIG. 2A, the circles (nodes) of the knowledge model 212 represent entities, and the diamonds represent types of relationships between entities. For example, and continuing with the example context, a first node can represent a Challenger as a type of Dodge sports car, and nodes connected to the first node can represent specific model types of the Challenger (e.g., base, GT, SRT, SRT 392, SRT Hellcat).

The stack processes the input data 210 to provide a feature matrix 214. In some examples, a feature selection (extraction) technique is applied to determine a set of features (e.g., $feat_1, \ldots, feat_n$) within the input data 210. Any appropriate feature selection technique can be implemented. Example feature selection techniques can include, without limitation, univariate techniques (e.g., auto-generated histograms), categorical data counting, term searches, and candidate token span matching using natural language processing (NLP), feature hashing, vectorization, and data normalization using encoders (e.g., one-hot encoding).

In some examples, a feature can be described as a distinctive attribute of the training data (e.g., an attribute that has some level of impact on a result). For example, one feature, or combination of features may have a noticeable impact on a result, while another feature, or combination of features has little to no impact on the result. In some examples, the set of features can include tens, hundreds, or thousands of features. The feature matrix 214 includes a matrix of the set of features, and a set of measurements (e.g., $meas_1, \ldots, meas_m$), as well as respective values (e.g., $s_{1,1}, \ldots, s_{m,n}$) for each feature, measurement pair (e.g., $[feat_i, meas_j]$).

In some implementations, the feature matrix 214 can be provided as a sparse matrix (e.g., a matric containing more zero values than non-zero values). In some examples, values can be processed using binarization to be provided in binary form (e.g., zeros, ones). In some examples, a zero value indicates no relation (e.g., between a $feat_i$, and a $meas_j$), while a one value indicates some relation (e.g., between a $feat_i$, and a $meas_j$). In general, a sparse matrix can be described as a matrix, in which most of the elements are zeros. Any appropriate technique for providing the sparse matrix can be implemented.

With particular reference to the second portion 204, the VEL platform provides a transform-heuristics capture database 216 (e.g., provided as a table), and a label ensemble matrix 218. In some examples, the transform-heuristic capture database 216 records feature heuristics captured through multiple transformations (e.g., $trans_1, \ldots, trans_p$), which include, for each transformation, a respective feature set (e.g., each feature set including one or more features). In some examples, a transformation includes transforming the input data using a discriminative model trained with available labels (e.g., the linear transform produced by training a linear discriminant analysis algorithm). This transform effectively projects the input data to a new perspective that is capable of revealing latent features that can influence classifying unlabeled groups of data.

In some examples, and as described in further detail herein, a user provides user input based on one or more visualizations provided by the VEL platform. Example user input can include group selection, navigation, search queries, and the like, which are captured as heuristics. The heuristics are applied to subsequent transformations to inform the semi-automated labeling process. In other words, user input captured through user interactions with the visualizations provide knowledge as to the labeling process, which is considered during label selection in subsequent iterations of the labeling process.

In some examples, the label ensemble matrix 218 provides respective sets of labels (e.g., $labels_1, \ldots, labels_p$), each set of labels providing a label assigned to each measurement in the set of measurements (e.g., $meas_1, \ldots, meas_m$). In some examples, each set of labels reinforces, and concatenates domain knowledge captured in the knowledge model 212. The label ensemble matrix 218, or at least a set of labels recorded therein (e.g., a column) can be provided as output for use in training a ML model. For example, one or more of the sets of labels, and corresponding measurements can be provided as labeled training data, which can be used to train a ML model.

Figure 2B:
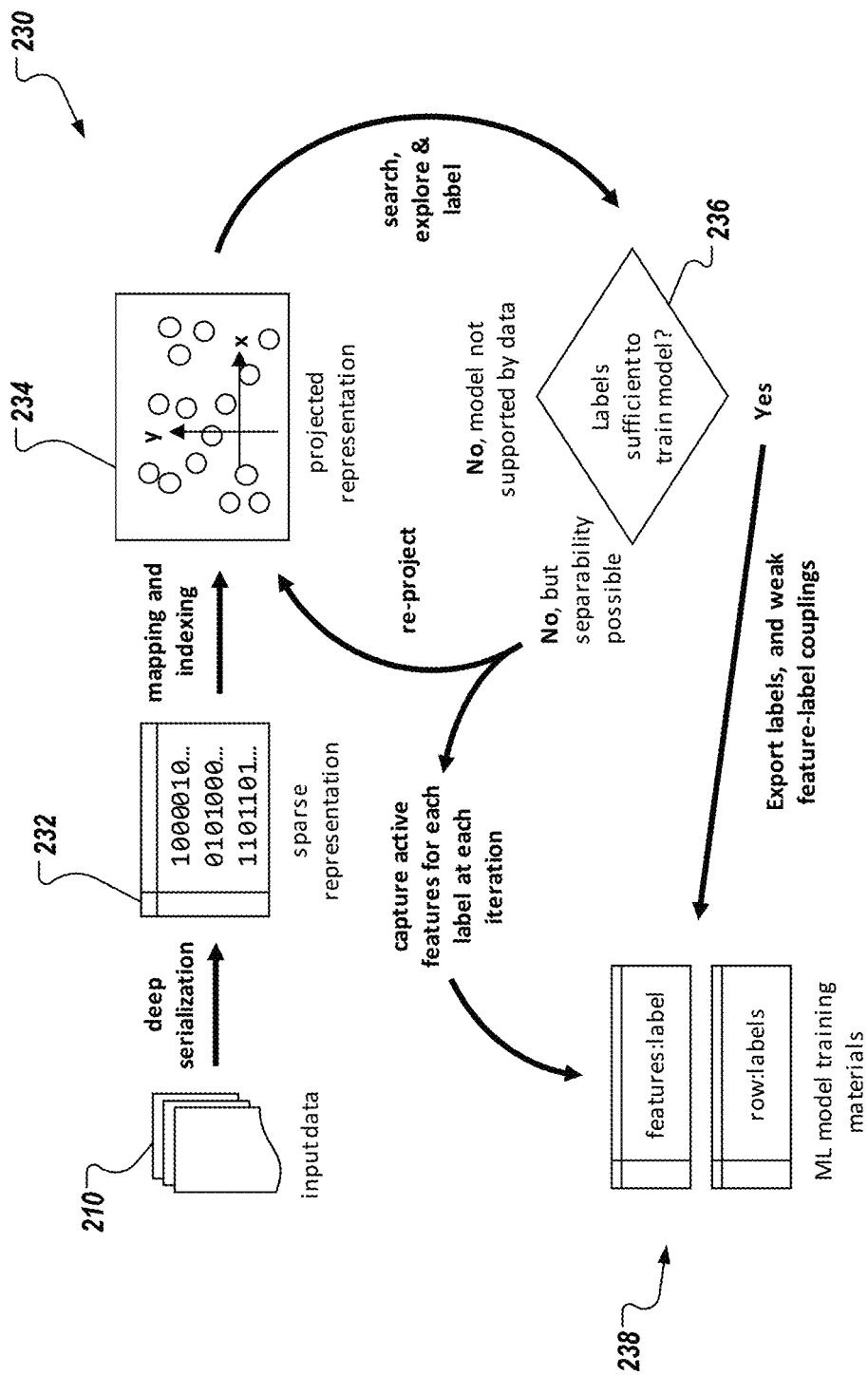

FIG. 2B depicts a conceptual diagram 230 in accordance with implementations of the present disclosure. The example of FIG. 2B provides more granular detail of processing of the input data 210 to provide a set of labeled training data 238. For example, and as described with reference to FIG. 2B, the input data 210 is processed using deep serialization to provide a sparse representation 232 (e.g., sparse matrix), which is used to provide a visualization 234 (e.g., projected representation). As described in further detail herein, the VEL platform of the present disclosure provides visual tools that enable a user to search, explore, and curate labels of training data, which actions can be recorded as heuristics. A determination 236 can be made as to whether a current set of labels is sufficient to train an ML model. If it is determined that the labels are insufficient, the input data 210 can be transformed in a next iteration to provide an updated projection 234. If it is determined that the labels are sufficient, labeled training data 238 is exported for training of the ML model. In some examples, it may be determined that only a portion of the labeled training data is sufficient, and can be separated from another portion of the labeled training data that is insufficient. Consequently, the portion that is sufficient can be exported for training of the ML model. In some examples, after one or more iterations, it can become apparent that the training data is not appropriate for providing labels in the domain of the ML model (e.g., vehicle data is being used for labeling, but the ML model relates to a domain other than vehicles). Consequently, it can be determined that the ML model is not supported by the training data, and the labeling process can terminate.

In accordance with implementations of the present disclosure, the VEL platform processes the feature matrix to provide a multi-dimensional (e.g., two-dimensional), graphical visualization of the feature matrix. In some examples, manifold mapping is used to provide the feature matrix as a multi-dimensional map (e.g., two-dimensional map) of the features. An example visualization includes a coincidence grid (or map). In general, a mapping technique is executed to reduce the dimensionality of the data set, and provide the multi-dimensional map as a visualization. Any appropriate mapping technique can be used to provide the multi-dimensional map. Example techniques include, without limitation, t-distributed stochastic neighbor embedding (t-SNE), principal component analysis (PCA), isometric mapping (isomap), local tangent space alignment (LTSA), and functional discriminant analysis (FDA).

Example visualizations (e.g., coincidence grid, and data map) are depicted below in FIGS. 3A-3C. In some examples, processing of the input data can depend on the type of data granularity, and the format of the input data. The following table depicts example visualization techniques based on input data format, and data granularity type:

TABLE 1

Visualization Techniques sorted by format and granularity.

| | Individual Measurements | Unsupervised Clustering/ Mapping | Feature-based Aggregation |
|---|---|---|---|
| Un-structured | View raw input data in HTML with feature-based decoration. | Map input data to Cartesian grid. Force-directed network graph. | Text search (service used for caption generation). Attribute/ feature-based aggregation (bar/bubble chart). |
| Semi-Structured | Parse input data to venerate information-rich document views. Hover text. | Map input data to Cartesian grid. Force-directed network graph. | Text search (service used for caption generation). Attribute/ feature-based aggregation (bar/bubble chart). |
| Structured | Provide table of selections. Hover text. | Map input data to Cartesian grid. Force-directed network graph. | Coincidence Grid Feature Search/Match |

In some implementations, each visualization technique can be encapsulated in a module that is included in the stack, and the VEL platform is configurable for each case. That is, depending on the format of the uploaded input data, and the granularity requested, the VEL platform provides respective visualizations.

In some implementations, and as described herein, a user can interact with the visualizations to guide the data labeling process. For example, the user can group select data points displayed in the visualizations. In some examples, a group select can be performed based on features, an area where features are displayed in the visualization, search terms, and the like. In some implementations, the user can assign a label to a group, which label can be considered in automated labeling of other data points during a subsequent iteration of the labeling process. Accordingly, the user provides input to the data labeling process that can be used to revise assigned labels, and/or automatically assign labels to data points within the training data. The user input is captured as heuristics, which capture knowledge of the labeling process, and are used to conduct iterative transformations on the training data to provide increasingly accurate labels for the training data.

Figure 3A:
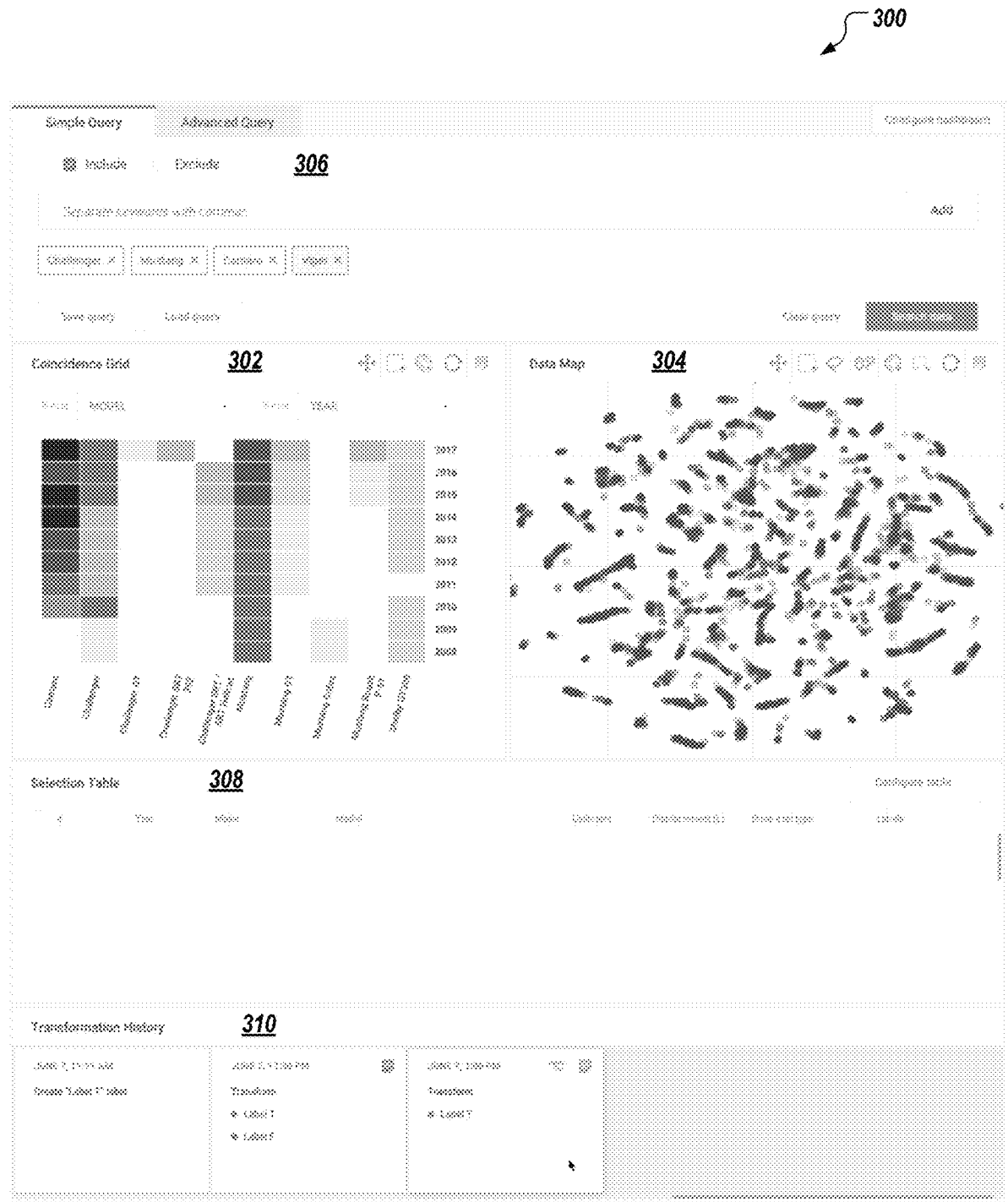
FIGS. 3A-3C depict an example graphical user interface (GUI) in accordance with implementations of the present disclosure.
Figure 3B:
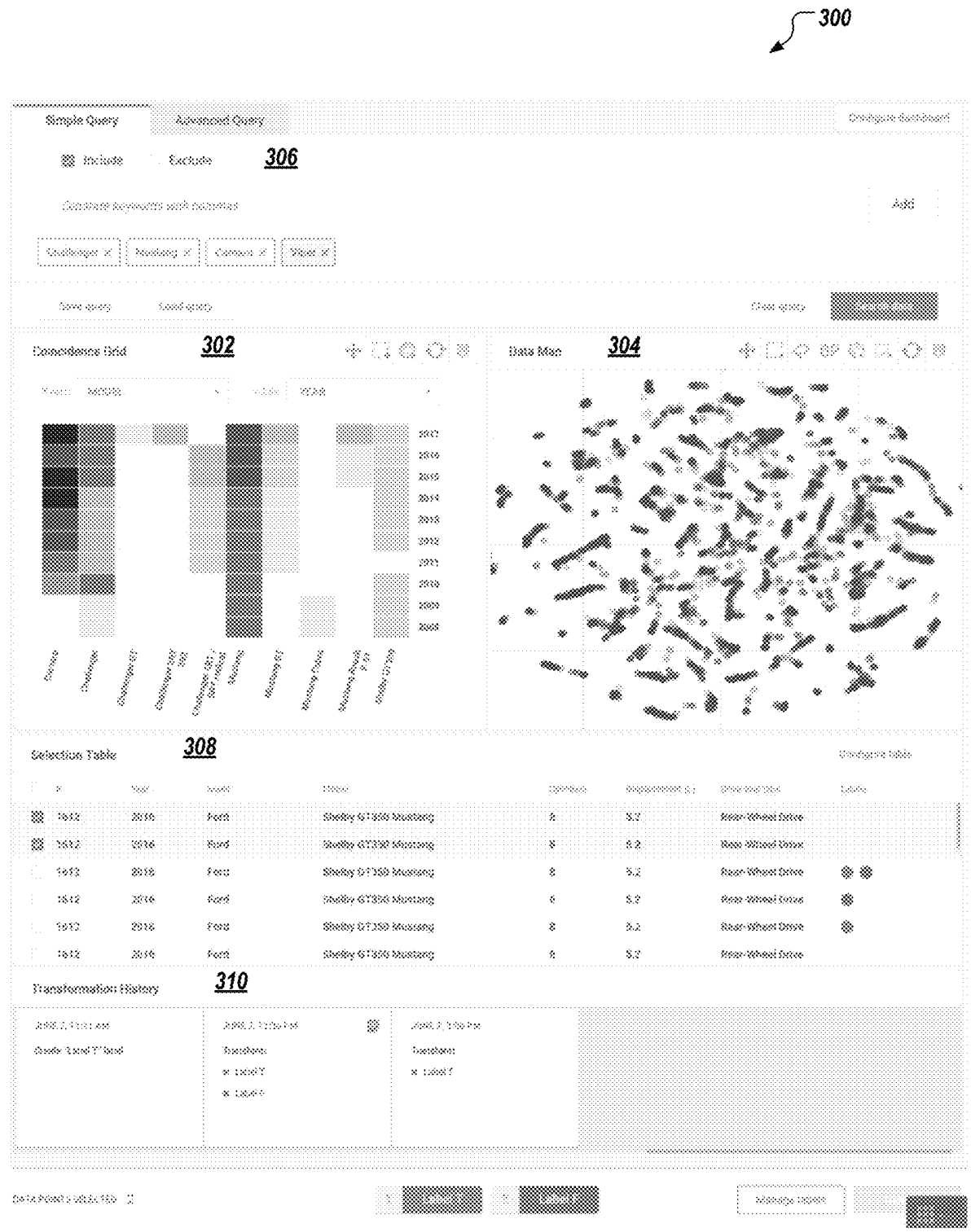
Figure 3C:
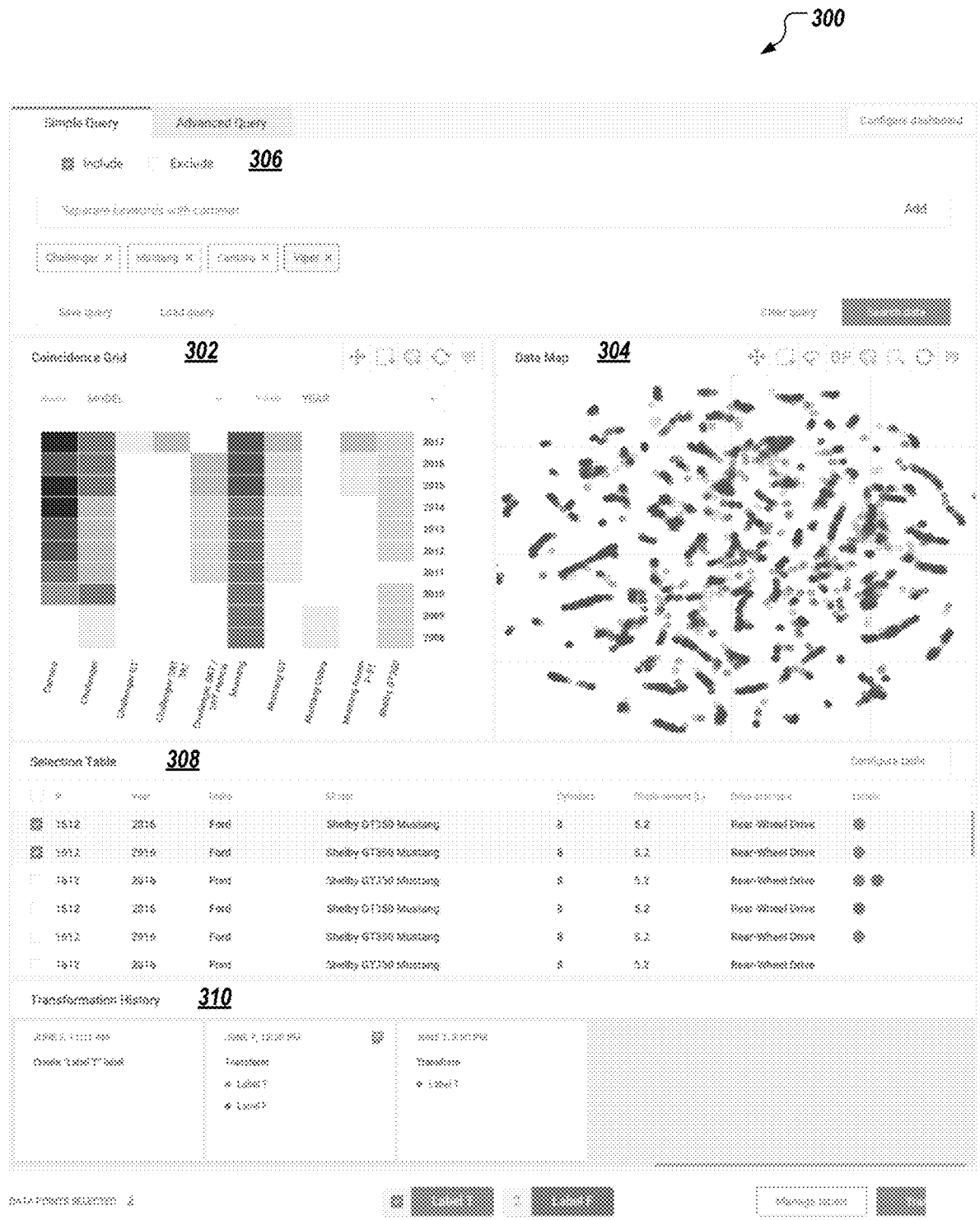

In further detail, a first visualization can include a two-dimensional data map that maps each data point of the training data within an x-y plane (x-axis, y-axis) (e.g., as depicted in FIGS. 3A-3C). A second visualization can be provided based on the first visualization. For example, the user can provide input to the first visualization to group select data points, and the second visualization can be provided based on the group of data points selected within the first visualization. It is contemplated that any appropriate visualization can be used for the second visualization in implementations of the present disclosure. In some examples, the user can select the type of visualization for the second visualization.

In one example, the second visualization can include a coincidence grid that includes cells indicating a number of coincidences of data points for given parameters (e.g., the number of data points corresponding to respective model-year pairs). In some examples, within the coincidence grid, each cell is assigned a color indicating a relative frequency of data points corresponding to the respective cell (e.g., dark color indicates high frequency, light color indicates low frequency). In another example, the second visualization can include one or more word clouds. For example, word clouds can be provided, which represent the relative frequencies of words across the group of data points selected by the user. In some examples, within a word cloud, larger words (e.g., or shapes representing words) indicate more frequent words.

In some implementations, the user can view the second visualization to indicate an accuracy of labels, to revise labels assigned to, and/or to assign labels to the data points within the selected group. By way of non-limiting example, the user can provide input indicating an accuracy of labels by selection of true/false options. For example, a word cloud can indicate that a particular drug treats a particular condition. If, as determined by the user (e.g., a domain expert in drug treatments), the drug does indeed treat the condition, the user can select a true option. If, as determined by the user (e.g., a domain expert in drug treatments), the drug does not treat the condition, the user can select a false option. As another example, if no label is yet assigned to the data points of the group, the user can select a label that is to be assigned to the data points. As another example, if a label is assigned to the data points of the group, but is determined to be inaccurate by the user, the user can clear the inaccurate label, and assign a more appropriate label. As another example, if a label is assigned to the data points of the group, and is determined to be accurate by the user, the user can indicate affirmance of the label.

As described herein, each of the user inputs through the visualizations are recorded as heuristics, which can be applied in subsequent transformations of the training data. In some examples, the subsequent transformations can include automatically: assigning labels to unlabeled data (e.g., based on features the user has indicated as important through interactions with the visualizations), relabeling data based on user input indicating inaccuracy of previous labels, and the like. In accordance with implementations of the present disclosure, multiple iterations of transformations can be performed until the user is satisfied with the amount of labeled training data, and the accuracy thereof. For example, with each iteration, a larger number of training data is labeled. If the user is satisfied with the accuracy of the labels, as determined through the visualizations, and the amount of labeled training data, the labeling process can end, and the labeled training data can be exported to be used in a subsequent model training process (e.g., exported as structured data in a computer-readable file). The larger the labeled training data set, the more accurate the subsequently trained ML model will be. Consequently, having all of the training data labeled could be desired. This, however, can be balanced with the time and computing resources required to label all of the training data. In view of this, it is contemplated that less than all of the training data can be labeled, while still providing a sufficiently robust set of labeled training data for an acceptably accurate ML model.

FIGS. 3A-3C depict an example GUI 300 in accordance with implementations of the present disclosure. The example GUI 300 is provided by the VEL platform of the present disclosure, and can be displayed to a user on a computing device (e.g., displayed on the device 102 of FIG. 1). Although example visualizations are depicted in FIGS. 3A-3C, it is contemplated that any appropriate visualizations can be provided. The examples of FIGS. 3A-3C are provided based on the example automotive vehicle data introduced above.

With particular reference to FIG. 3A, the example GUI 300 includes a first visualization 302, and a second visualization 304. In the depicted example, the first visualization 302 is provided as a coincidence grid, and the second visualization 304 is provided as a two-dimensional data map. The example GUI 300 further includes a search query interface 306, a selection table 308, and a transformation history 310.

The example GUI 300 enables a user to group select training data (e.g., displayed in the second visualization 304) based on one or more user inputs. Example user inputs include, without limitation, a search query, and a graphical boundary. The example of FIGS. 3A-3C include the user input being provided as a search query. In the example of FIG. 3A, an example search query includes models of vehicles, and can be described as a simple query. In some examples, in response to the search query, the first visualization 302, and the second visualization 304 are modified to depict data points corresponding to the search terms of the search query. In some examples, the user can provide a more complex search query (e.g., by selecting the "Advance Query" tab). Example advanced queries can include [(Challenger) AND (Mustang) AND (Camaro)], or [(("Challenger" OR "Challenger Car") AND ("Mustang") AND ("Camaro"))]. As another example, the second visualization 304 can depict clusters of data points. A visualization tool can enable the user to draw boundaries around one or more clusters (e.g., free-form boundaries, shape (circle, oval, rectangle) boundaries). In some examples, the coincidence grid 302 is updated based on the selected data points.

In accordance with implementations of the present disclosure, the user input (e.g., search query) can indicate a relative importance of particular data points. In the example of FIGS. 3A-3C, the user input can indicate that data points corresponding to Challengers, Mustangs, and Camaros, are more important to the user than data points corresponding to other vehicles (e.g., Porsche 911s, Dodge Vipers, Chevrolet Corvettes). For example, the user may be labeling training data that will be used to train an ML model that is to specifically classify images as depicting Challengers, Mustangs, and Camaros, and is unconcerned with other vehicle models.

With particular reference to FIG. 3B, user input can be provided to select one or more data points from the first visualization 302, and/or the second visualization 304. In the depicted example, the user has selected the cell of the coincidence grid of the first visualization 302 corresponding to data points associated with model year 2016 Shelby GT300 series of Mustangs. In response, the selection table 308 can provide a list of data points within the training data that correspond to the selected cell. In some examples, if any data points have been assigned labels (e.g., Label T, Label F), the assigned labels are depicted in the selection table. For example, labels may be automatically applied by the underlying labeling process. In the depicted example, the user has provided input selecting the top two data points in the selection table, which data points have not been assigned labels. In some examples, in response to user selection of data points in the selection table 308, the data points are highlighted in the data map of the second visualization 304.

In accordance with implementations of the present disclosure, the user can provide user input to assign labels, and/or edit already assigned labels. For example, and with reference to FIG. 3C, the user can select Label T, which is assigned to the data points elected within the selection table 308. Although not depicted in the examples of FIGS. 3B and 3C, the user can select other data points to revise assigned labels (e.g., labels automatically assigned by the labeling process). For example, the user could select the third and fourth data points in the selection table 308 to remove Label F. For example, the user can determine that the proper label is Label T. In the third data point, Label F can be removed as conflicting with Label T, and, in the fourth data point, Label F can be removed as improper, and replaced by Label T.

In accordance with implementations of the present disclosure, the user inputs can be recorded as heuristics, which can be applied to subsequent transformations of the training data for automatic labeling of unlabeled training data. For example, the sequence of user inputs described for FIGS. 3A-3C provides knowledge that particular data points are of more importance (e.g., Challengers, Mustangs, Camaros), and that certain data points should assigned a particular label (e.g., Shelby GT350 Mustangs should be assigned Label T). Accordingly, the labeling process learns from the heuristics, which learning is applied to labeling of training data in subsequent iterations. In some examples, capturing and processing features important to the assignment of labels (heuristics) is used to identify correlative features, and drive a search recommendation engine to make the labeling process faster. Once the labeled data is of adequate completeness, the exported labels and label-feature set contexts will both be available for training and model refinement, as described herein.

Figure 4:
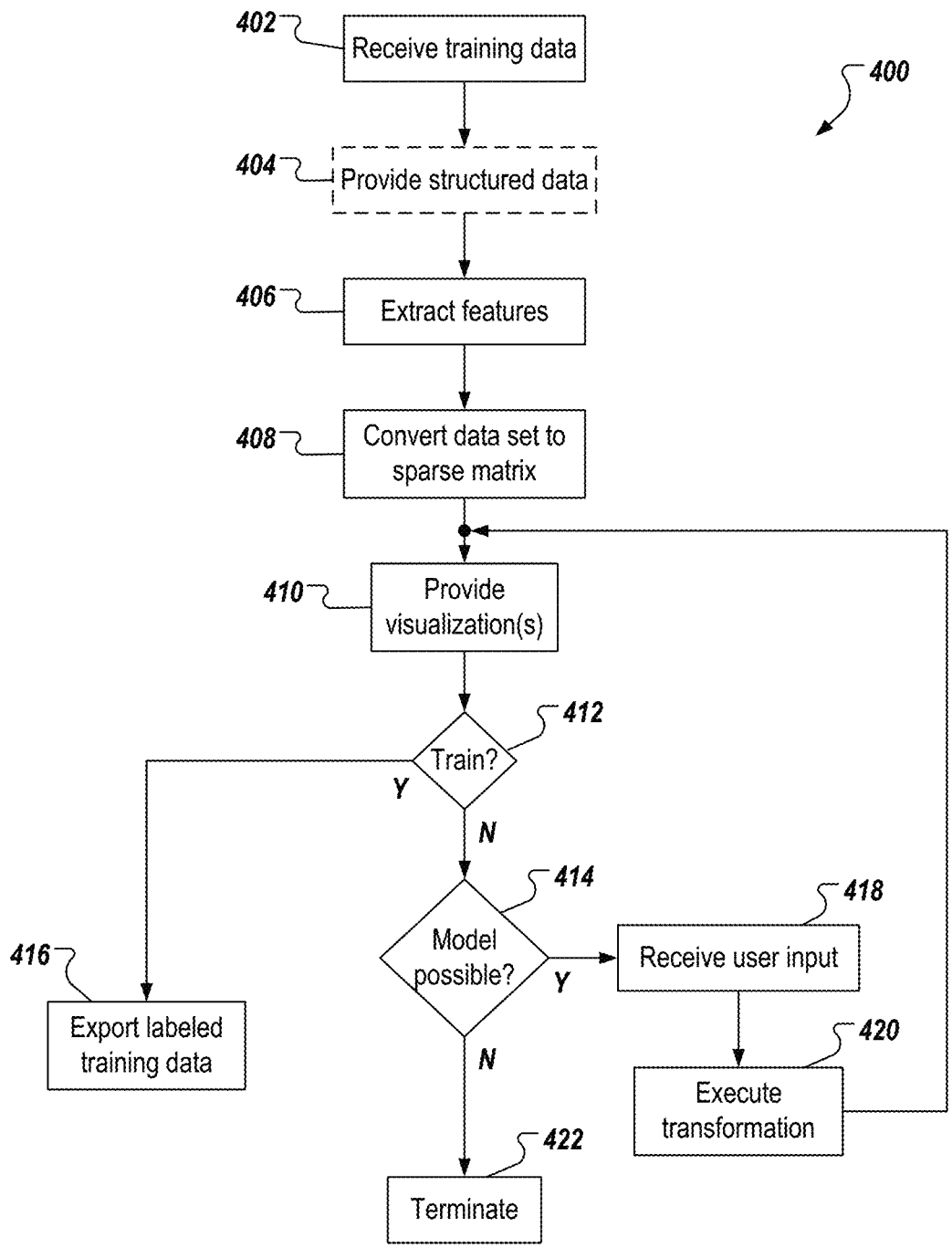
FIG. 4 depicts an example process that can be executed in accordance with implementations of the present disclosure.

FIG. 4 depicts an example process 400 that can be executed in implementations of the present disclosure. In some examples, the example process 400 is provided using one or more computer-executable programs executed by one or more computing devices (e.g., the server system 112 of FIG. 1).

A set of training data is received (402). For example, a user uploads one or more computer-readable files containing the training data to the VEL platform. The set of training data includes a plurality of data points, at least a portion of which are to be labeled for subsequent supervised training of a computer-executable ML model. As an option, structured data can be provided (404). For example, if the set of training data includes unstructured data, the unstructured data can be processed by the VEL platform to provide structured data.

A set of features is extracted from the training data (406). For example, the VEL platform uses one or more feature extractions techniques to extract the set of features, as described herein. The data set is converted to a sparse representation, such as a sparse matrix (408). At least one visualization is provided (410). For example, the VEL platform provides the at least one visualization based on the set of training data. As described herein, the at least one visualization includes a graphical representation of at least a portion of the set of training data. Example visualizations include the first visualization 302, and the second visualization 304, described above with reference to the example GUI 300 of FIGS. 3A-3C.

It is determined whether the currently provided labels are sufficient to train a target ML model (412). For example, the user can provide user input to the VEL platform indicating whether the labels are sufficient to train the ML model. In some examples, it can be determined that at least a portion of the labeled training data is sufficient to train the ML model. If the labels are not sufficient to train the ML model, it can be determined whether training of the ML model is practical using the training data (414). If training of the ML model is practical, user input is received (418). In some examples, the user input is associated with the at least one visualization. In some examples, the user input indicates an action associated with a label assigned to a respective data point in the set of training data. A transformation is executed on data points of the set of training data (420). In some examples, and as described herein, the transformation is based on one or more heuristics representing the user input. In some examples, the transformation re-projects the labeled training data to provide labeled training data in a set of labeled training data, and the process 400 loops back to update the at least one visualization (410).

If it is determined that the labels are sufficient for training the ML model (412), the labeled training data is exported for training the ML model. For example, the VEL platform transmits one or more computer-readable files containing the labeled training data to a model training system. In some examples, if it is determined that a portion of the labeled training data is sufficient, the portion of the labeled training data is separated, and is exported for training the ML model. If it is determined that training of the ML model is not practical (414), the labeling process terminates (422).

In view of the foregoing, the VEL platform of the present disclosure leverages users' natural predispositions for visual multiplexing and discrimination. As described herein, the ensemble of labels aggregated over each interaction can be aggregated, and used to train a generative model for expanding the labels to the full dataset, and data that may be subsequently provided. In some examples, training generative models can use sampling and inference techniques of weak supervision systems (e.g., Snorkel). The VEL platform enables users to load, access, and visualize data in custom built modules. By providing a user interface for rapid data exploration and ensemble labeling, users are able to quickly build predictive models that embody priors and hypotheses regarding a problem. Furthermore, users of the VEL platform will be constantly presented with visual evidence, with which to update or confirm assumptions, with the overall motivation of grounding models in strong empirical evidence.

Further, the VEL platform enables limitations of labeling systems to be overcome. For example, Snorkel requires users to provide labeling functions, which can be described as computer-executable code (e.g., scripts) that are executed to heuristically label training data. This consumes computing resources, and also requires multiple users to be involved (e.g., a computer coding expert that can code the multiple, required labeling functions, and a domain expert to determine validity/accuracy of assigned labels). In contrast, the VEL platform of the present disclosure avoids the need for labeling scripts to be provided, and enables a single user (e.g., a domain expert) to inform the labeling process through the visualizations.

In accordance with implementations of the present disclosure, iterations transformations provides iterative labeling of data points, and remapping of the displayed projection (e.g., data map visualization) to minimize like category scatter, and maximize unlike category spacing. As the number of labeled data points increases scatter and similarity become better defined. In some implementations, the data mapping is initialized with an unsupervised approach to provide naturally emerging. The discovered clusters can be explored (e.g., by the user, through the visualization(s) to see if any relevant novel models emerge from the data. Once some of the data has been labeled and remapped, unlabeled data correlative features are mapped to regions near label. The unlabeled data points can be considered candidates for reinforcing/refining labeling. Unlabeled data occupying the margins or outside of labeled data neighborhoods represent opportunities for refining label categories and group classification. Further, as labeled data is used to remap the projection (e.g., the data map), implementations of the present disclosure enable the user to visually evaluate the selectivity of the model-data combination being merged. If clusters or biasing in the map is observed to be associated with each of the categories (classes), the data is a good candidate for the model. If, even after a relatively high number of data points have been labeled, the labeled data remains randomly distributed in the data map, the data can be revealed as being incompatible with the model.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing a visual ensemble labeling (VEL) platform for at least semi-automated labeling of at least a portion of training data, the method being performed by one or more processors, and comprising:

receiving, by the one or more processors, a set of training data comprising a plurality of data points, at least a portion of which are to be labeled for subsequent supervised training of a computer-executable machine learning (ML) model;

providing, by the one or more processors, at least one visualization based on the set of training data, the at least one visualization comprising a graphical representation of at least a portion of the set of training data;

receiving, by the one or more processors, user input associated with the at least one visualization, the user input indicating an action associated with a label assigned to a respective data point in the set of training data;

executing, by the one or more processors, a transformation on data points of the set of training data based on one or more heuristics representing the user input to provide labeled training data in a set of labeled training data; and transmitting, by the one or more processors, the set of labeled training data for training the ML model.

2. The method of claim 1, wherein the at least one visualization is provided based on a sparse representation provided from the training data.

3. The method of claim 2, wherein the sparse representation comprises a sparse matrix.

4. The method of claim 1, wherein the label is provided at least partially based on a knowledge model comprising a data structure that records an ontology associated with a domain of the ML model.

5. The method of claim 1, wherein the at least one visualization comprises a two-dimensional data map.

6. The method of claim 1, wherein the at least one visualization comprises a coincidence grid.

7. The method of claim 1, wherein the user input comprises at least one search term, and the transformation results in an update to the at least one visualization based on the at least one search term.

8. One or more non-transitory computer-readable storage media coupled to one or more processors and having instructions stored thereon which, when executed by the one or more processors, cause the one or more processors to perform operations for providing a visual ensemble labeling (VEL) platform for at least semi-automated labeling of at least a portion of training data, the operations comprising:

receiving a set of training data comprising a plurality of data points, at least a portion of which are to be labeled for subsequent supervised training of a computer-executable machine learning (ML) model;

providing at least one visualization based on the set of training data, the at least one visualization comprising a graphical representation of at least a portion of the set of training data;

receiving user input associated with the at least one visualization, the user input indicating an action associated with a label assigned to a respective data point in the set of training data;

executing a transformation on data points of the set of training data based on one or more heuristics representing the user input to provide labeled training data in a set of labeled training data; and transmitting the set of labeled training data for training the ML model.

9. The computer-readable storage media of claim 8, wherein the at least one visualization is provided based on a sparse representation provided from the training data.

10. The computer-readable storage media of claim 9, wherein the sparse representation comprises a sparse matrix.

11. The computer-readable storage media of claim 8, wherein the label is provided at least partially based on a knowledge model comprising a data structure that records an ontology associated with a domain of the ML model.

12. The computer-readable storage media of claim 8, wherein the at least one visualization comprises a two-dimensional data map.

13. The computer-readable storage media of claim 8, wherein the at least one visualization comprises a coincidence grid.

14. The computer-readable storage media of claim 8, wherein the user input comprises at least one search term, and the transformation results in an update to the at least one visualization based on the at least one search term.

15. A system, comprising:
one or more processors; and
a computer-readable storage device coupled to the one or more processors and having instructions stored thereon which, when executed by the one or more processors, cause the one or more processors to perform operations for providing a visual ensemble labeling (VEL) platform for at least semi-automated labeling of at least a portion of training data, the operations comprising:
receiving a set of training data comprising a plurality of data points, at least a portion of which are to be labeled for subsequent supervised training of a computer-executable machine learning (ML) model;
providing at least one visualization based on the set of training data, the at least one visualization comprising a graphical representation of at least a portion of the set of training data;
receiving user input associated with the at least one visualization, the user input indicating an action associated with a label assigned to a respective data point in the set of training data;
executing a transformation on data points of the set of training data based on one or more heuristics representing the user input to provide labeled training data in a set of labeled training data; and
transmitting the set of labeled training data for training the ML model.

16. The system of claim 15, wherein the at least one visualization is provided based on a sparse representation provided from the training data.

17. The system of claim 16, wherein the sparse representation comprises a sparse matrix.

18. The system of claim 15, wherein the label is provided at least partially based on a knowledge model comprising a data structure that records an ontology associated with a domain of the ML model.

19. The system of claim 15, wherein the at least one visualization comprises a two-dimensional data map.

20. The system of claim 15, wherein the at least one visualization comprises a coincidence grid.

* * * * *